US012024922B2

(12) United States Patent
Bromley et al.

(10) Patent No.: US 12,024,922 B2
(45) Date of Patent: Jul. 2, 2024

(54) LOCK INDICATOR, CARTRIDGE, AND A MECHANICAL LOCK ASSEMBLY

(71) Applicant: AVANTIS HARDWARE LIMITED, Cannock (GB)

(72) Inventors: Ryan Bromley, Cannock (GB); Mark Cope, Cannock (GB)

(73) Assignee: AVANTIS HARDWARE LIMITED, Cannock (GB)

( * ) Notice: Subject to any disclaimer, the term of this patent is extended or adjusted under 35 U.S.C. 154(b) by 0 days.

(21) Appl. No.: 17/732,326

(22) Filed: Apr. 28, 2022

(65) Prior Publication Data

US 2022/0372792 A1 Nov. 24, 2022

Related U.S. Application Data

(63) Continuation of application No. 16/618,763, filed as application No. PCT/GB2018/051493 on May 31, 2018, now Pat. No. 11,339,588.

(51) Int. Cl.

*E05B 45/06* (2006.01)
*E05B 15/16* (2006.01)
*E05B 39/04* (2006.01)
*E05C 9/00* (2006.01)
*E05B 47/00* (2006.01)

(52) U.S. Cl.

CPC .......... *E05B 39/04* (2013.01); *E05B 15/1635* (2013.01); *E05C 9/004* (2013.01); *E05B 2047/0069* (2013.01); *E05Y 2400/612* (2013.01); *E05Y 2400/66* (2013.01)

(58) Field of Classification Search

CPC ................. E05B 39/04; E05B 15/1635; E05B 2047/0069; E05B 2047/0091; E05B 41/00; E05C 9/004; E05Y 2400/612; E05Y 2400/66

USPC .......................................................... 340/542

See application file for complete search history.

(56) References Cited

U.S. PATENT DOCUMENTS

| | | | | |
|---|---|---|---|---|
| 6,950,033 | B1 | 9/2005 | Guyre | |
| 2003/0160681 | A1 * | 8/2003 | Menard | G07C 9/00309 340/5.64 |
| 2014/0033773 | A1 | 2/2014 | Myers et al. | |

(Continued)

FOREIGN PATENT DOCUMENTS

| | | | |
|---|---|---|---|
| EP | 0627537 | A1 | 12/1994 |
| WO | 2007020623 | A2 | 2/2007 |
| WO | 2018039607 | A1 | 3/2018 |

OTHER PUBLICATIONS

Pella Insynctive Product Guide, Integrated Patio Door Sensors, Pella Corporation 2016.

(Continued)

*Primary Examiner* — Tai T Nguyen

(74) *Attorney, Agent, or Firm* — Pillsbury Winthrop Shaw Pittman, LLP

(57) ABSTRACT

A lock indicator and a mechanical lock assembly, comprising: a switch; a transmitter coupled to a power source; and a bolt member moveable between a retracted position and an extended position with respect to the housing, wherein the switch is configured to engage the bolt member and is actuatable by the bolt member to determine the position of the bolt member, and the transmitter is configured to transmit a signal indicative of the position of the bolt member to a remote device.

13 Claims, 6 Drawing Sheets

(56) References Cited

U.S. PATENT DOCUMENTS

| | | | | |
|---|---|---|---|---|
| 2018/0155959 | A1* | 6/2018 | Hartung | E05B 17/10 |
| 2019/0003206 | A1* | 1/2019 | Sanford | G07C 9/00182 |

OTHER PUBLICATIONS

X1R Smart—User Manual, Iseo.com, Jan. 2017.

Phillips, Bill, The Complete Book of Locks and Locksmithing, Sixth Edition, pp. 1-620, 2005.

Sensing & Control Celebrities the Micro Switch 75TH Anniversary, The Switch Is On, Sep. 7, 2007.

Cohen, Jamie, Honeywell Celebrates 75 Years of Micro Switch Technology Innovation, Simple Technology Make Significant Impact on Our World, Sep. 19, 2007.

Chubb, Internal GA Mortice Deadlock Double Pole Microswitch, Dec. 3, 1997.

CGK15, Sales data provided by Assa Abloy Limited for 3G114 Microswitch lock variants between 2012 and 2017.

Chubb Locks, Chubb Price List effective Feb. 2010. www.uniononline.co.uk.

Assa Abloy, Union 2015 Price List effective from Jan. 1, Jul. 31, 2015.

Assa Abloy, Replace the lock, not your whole door. Genius. Adjustable: Replacement PVCu Door Lock, 2011.

Assa Abloy, Replace the lock, not your whole door. Genius. Professional: Replacement PVCu Door Lock, 2011.

Assa Abloy, Replace the lock, not your whole door. Genius. Universal: Replacement PVCu Door Lock, 2011.

TOOLSTATION—webpage captured Aug. 10, 2023.

The Wayback Machine—http:web.archive.org/web/20170519055754/http://www.diy.com:80/departments/doors-win ... webpage captured Aug. 10, 2023.

* cited by examiner

LOCK INDICATOR, CARTRIDGE, AND A MECHANICAL LOCK ASSEMBLY

CROSS-REFERENCE TO RELATED APPLICATIONS

This application is a continuation of U.S. application Ser. No. 16/618,763, filed 2 Dec. 2019, titled "A LOCK INDICATOR, CARTRIDGE, AND A MECHANICAL LOCK ASSEMBLY," now issued as U.S. Pat. No. 11,339,588 on 24 May 2022. U.S. application Ser. No. 16/618,763 is a 371 application of PCT/GB2018/051493, filed on 31 May 2018, and sharing the same title, which in turn claims priority to GB 1708796.6 filed 2 Jun. 2017. The entire content each of the aforementioned patent-filings are hereby incorporated by reference.

BACKGROUND

1. Field

Embodiments of the present invention relate to a lock indicator, a mechanical lock assembly, and a cartridge.

2. Description of the Related Art

Attempted break-ins are more successful in cases where a user has forgotten to lock a window or door of the building, and many insurance policies do not cover damage caused when a window or door is left unlocked.

A user may also have doubts about whether a window or door has been locked at a time when it is inconvenient to check—e.g. as they are now remote from the window or door. This can cause the user anxiety and can force the user to return to the door or window to check the lock state. This is inconvenient if the user is in another part of the building and can be very difficult if the user has left the building entirely.

Remotely operated locks for windows and doors are known. Such locks often use electromagnetically driven bolt mechanisms. However, such locks are typically expensive and often do not fit within the same form as an original lock—making fitting more difficult and/or potentially being aesthetically unpleasant.

SUMMARY

The present invention seeks to alleviate one or more problems associated with the prior art.

An aspect of the present invention provides a lock indicator and a mechanical lock assembly, comprising: a switch; a transmitter coupled to a power source; and a bolt member moveable between a retracted position and an extended position with respect to the housing, wherein the switch is configured to engage the bolt member and is actuatable by the bolt member to determine the position of the bolt member, and the transmitter is configured to transmit a signal indicative of the position of the bolt member to a remote device.

The switch may be configured to be actuated by direct engagement with the bolt member.

The transmitter may be a wireless transmitter.

The assembly may further include the power source.

The switch and bolt member may be located in a main body of a housing of the assembly and the power source may be located in an auxiliary housing remote from the main body of the housing.

The housing may include a faceplate member and the power source may be accessible through an aperture defined by the faceplate member.

The auxiliary housing may be made of a plastics material.

The transmitter may be located within the auxiliary housing.

The transmitter and power source may be provided in a cartridge configured to be received by the auxiliary housing.

The cartridge may include one or more external electrical contacts configured to abut one or more auxiliary housing electrical contacts to provide electrical communication between the transmitter and the switch.

The cartridge may be replaceable.

The bolt member may be manually moveable.

The assembly may further include a lock mechanism which may be configured to receive a key and to drive movement of the bolt member.

Another aspect provides a door or window including: a moveable panel; and an assembly as above.

Another aspect provides a system including an assembly and a remote device configured to receive the signal indicative of the position of the bolt member.

Another aspect provides a cartridge for use in a lock indicator and with a mechanical lock assembly, including: a transmitter, wherein the transmitter is configured to transmit a signal indicative of a position of a bolt member of the mechanical lock assembly to a remote device, and the transmitter is communicatively coupleable to a switch configured to determine the position of the bolt member, the cartridge being configured for releasable receipt in a housing of the lock indicator.

The cartridge may further include a power source.

The cartridge may further include one or more external electrical contacts configured to abut one or more electrical contacts of the housing of the lock indicator.

The cartridge may include a retaining mechanism to retain, selectively, the cartridge in the housing of the lock indicator.

Another aspect provides a lock indicator and a mechanical lock assembly, comprising: a switch coupleable to a transmitter; a housing configured to receive a cartridge including the transmitter; and a bolt member moveable between a retracted position and an extended position with respect to the housing, wherein the switch is configured to engage the bolt member and is actuatable by the bolt member to determine the position of the bolt member, and the transmitter is configured to transmit a signal indicative of the position of the bolt member to a remote device.

BRIEF DESCRIPTION OF THE DRAWINGS

Embodiments of the invention are described, by way of example only, with reference to the accompanying drawings, in which.

DETAILED DESCRIPTION OF CERTAIN EMBODIMENTS

Figure 1:
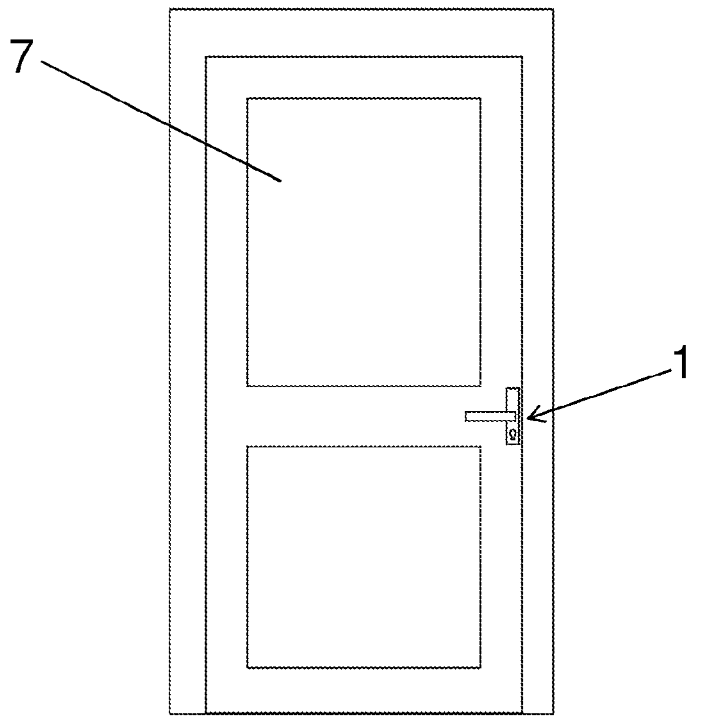
FIG. 1 shows a view of a door.

With reference to FIGS. 1-5, embodiments of the present invention include a lock indicator and a mechanical lock assembly 1 (the "assembly" 1). The assembly 1 has a housing 10 which is configured to house one or more other parts of the assembly 1.

The assembly 1 may be configured to be mounted on a moveable panel 7 of a window or door, for example. This mounting may be via the housing 10 which may, therefore, include one or more mounting arrangements. The or each mounting arrangement may include an aperture, for example, defined by the housing 10 and configured to receive at least part of a bolt or a screw.

The housing 10 may have a substantially rectangular cross-sectional shape and may configured to be received at least partially within a corresponding recess in the moveable panel 7. More specifically, in some embodiments, the assembly 1 (e.g. the housing 10) may be mounted to a frame of the moveable panel 7 and so, in such embodiments, the frame may define a recess which is configured to receive—at least partially—the housing 10.

The housing 10 may include a faceplate member 101 which is located on a first side or edge of the housing 10. The faceplate member 101 may be a generally elongate planar member which is mounted to a main body 102 of the housing 10. The faceplate member 101 may include one or more mounting configurations for use in securing the housing 10 to the moveable panel 7. The or each mounting configuration may be, for example, an aperture defined by the faceplate member 101 and configured to receive a bolt, screw, or rivet.

The assembly 1 may include at least one latch member 3. The or each latch member 3 may be configured to move between an extended position (for engagement with a window or door frame) and a retracted position (for disengagement from a window or door frame). The or each latch member 3 may be mounted to the housing 10 and may be substantially housed therein when in the retracted position (e.g. substantially within the main body 102). When in the extended position, a portion of the or each latch member 3 may extend beyond the confines of the housing 10 (e.g. beyond the confines of the main body 102 and, in some cases, through an aperture defined by the faceplate member 101). The movement of the or each latch member 3 may be along a respective latch member axis.

As such, with the assembly 1 fitted with respect to a door or window, opening of the door or window may be substantially prohibited with the or each latch member 3 in the extended position and may be substantially permitted with the or each latch member 3 in the retracted position.

Figure 2:
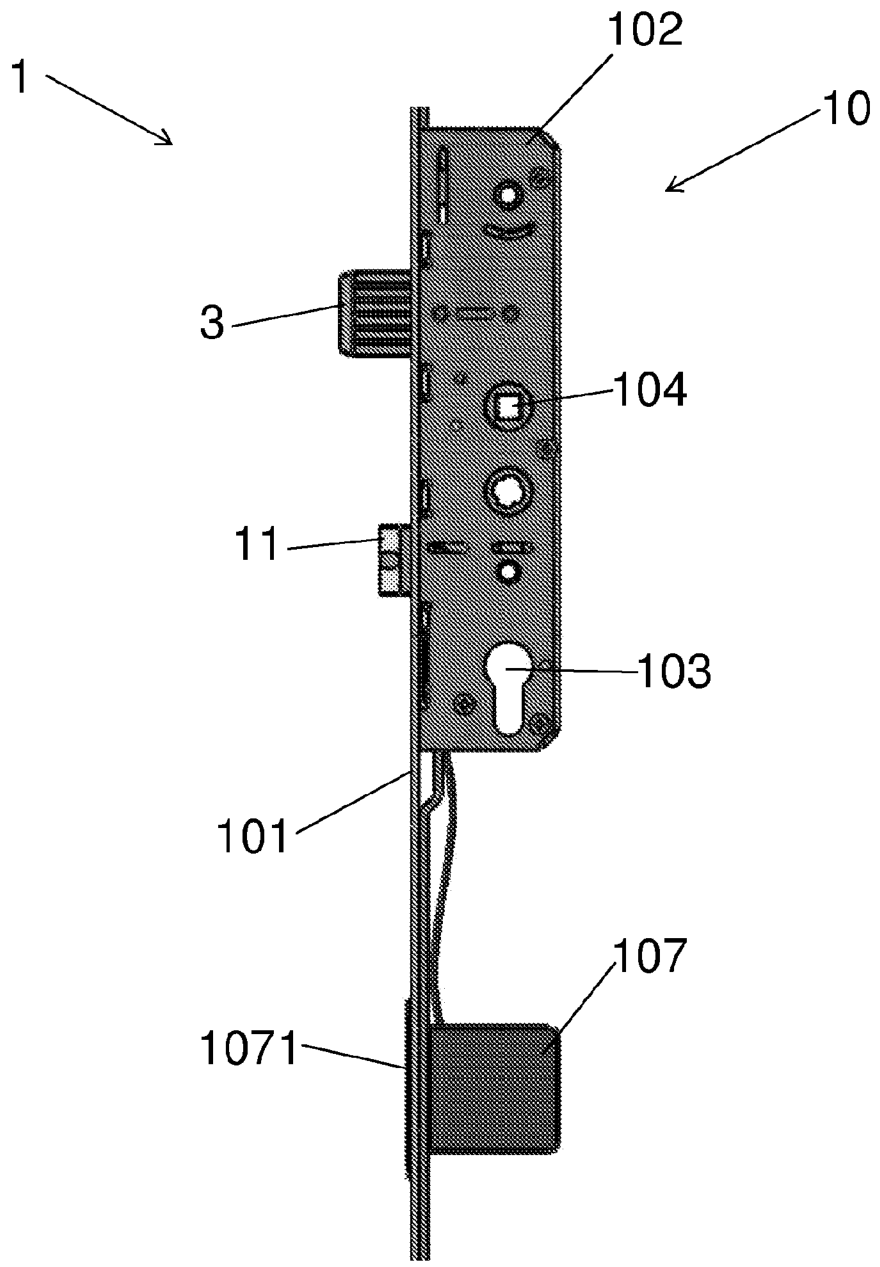
FIG. 2 shows a side view of an assembly.
Figure 4:
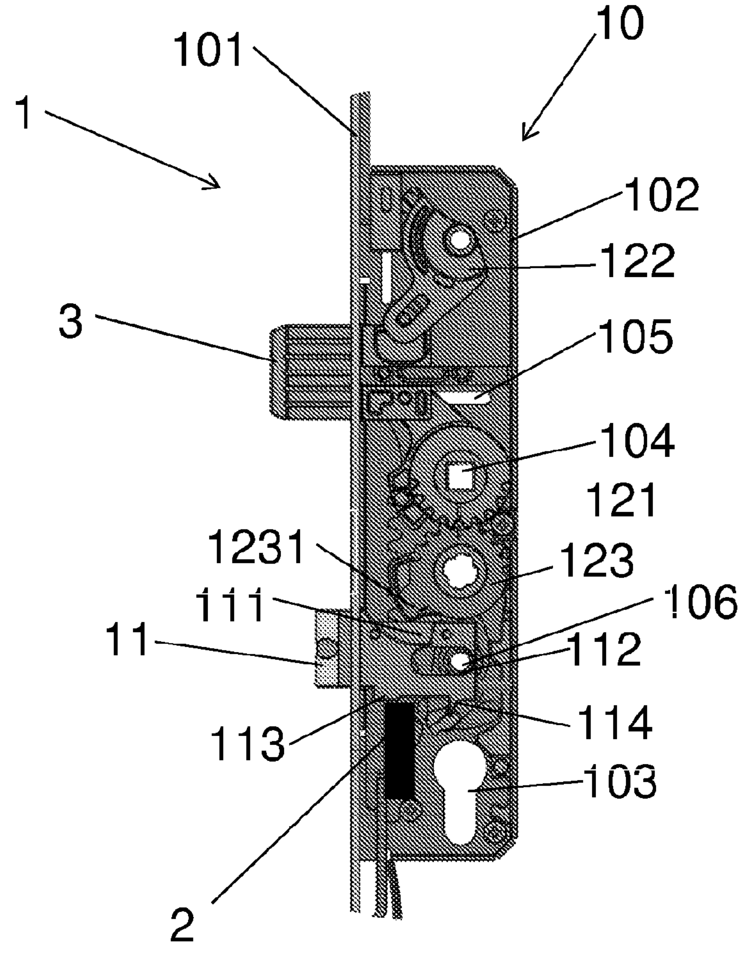
FIG. 4 shows a side view of part of an assembly with a part of a housing removed.
Figure 5:
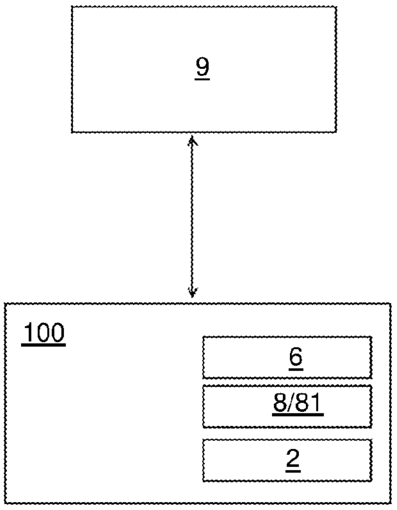
FIG. 5 shows a schematic diagram of a system.

In FIGS. 2 and 4, for example, the assembly 1 includes one latch member 3 and this is shown in the extended position.

The or each latch member 3 may include a bevelled or chamfered surface which is configured to engage the window or door frame. The bevelled or chamfered surface may be angled with respect to the associated latch member axis such that the engagement of that latch member 3 with the window or door frame causes movement of that latch member 3 towards its retracted position.

In some embodiments, the or each latch member 3 may be resiliently biased (e.g. by a spring) towards its respective extended position.

The assembly 1 includes a bolt member 11. The bolt member 11 may be configured to move between an extended position (for engagement with a window or door frame) and a retracted position (for disengagement from a window or door frame). The bolt member 11 may be mounted to the housing 10 and may be substantially housed therein when in the retracted position (e.g. within the main body 102). When in the extended position, a portion of the bolt member 11 may extend beyond the confines of the housing 10 (e.g. beyond the confines of the main body 102 and, in some cases, through an aperture defined by the faceplate member 101). The movement of the bolt member 11 may be along a bolt member axis.

As such, with the assembly 1 fitted with respect to a door or window, opening of the door or window may be substantially prohibited with the bolt member 11 in the extended position and may be substantially permitted with the bolt member 11 in the retracted position.

The bolt member 11 may not be resiliently biased into the extended or retracted position.

In some embodiments, the bolt member axis is generally parallel with at least one of the or each latch member axis.

Accordingly, the or each latch member 3 and the or each bolt member 11 may be carried by the housing 10. The or each latch member 3 may be used to hold the door or window in a closed position, whilst the bolt member 11 may be used to lock the door or window in the closed position.

As such, the bolt member 11 may be associated with a lock mechanism (not shown) which may include a lock cylinder mounted in a lock housing, wherein the lock cylinder is configured to receive a key. The lock cylinder may be associated with a lock armature which is configured to move between first and second positions (e.g. locked and unlocked positions) through rotation of the lock cylinder with respect to the lock housing—such movement being permitted when a correct key is inserted into the lock cylinder (the wrong key not enabling rotation of the cylinder with respect to the lock housing). Rotation of the lock cylinder with respect to the lock housing (and so, more generally, the actuation of the lock mechanism between locked and unlocked states) may be a manual process—i.e. performed by the exertion of manual force on the lock mechanism (e.g. on the lock cylinder via the key)—rather than an electrically driven process, for example.

The lock mechanism is configured to be at least partially housed in the housing 10 (e.g. in the main body 102). The housing 10 may, therefore, define an aperture 103 which is configured to receive at least part of the lock mechanism.

The assembly 1, with particular reference to FIG. 4 as an example, may include a mechanical gear assembly which may be configured to operate the bolt member 11—i.e. to drive movement of the bolt member 11 between the extended and retracted positions. The mechanical gear assembly may, therefore, provide mechanical coupling between the lock mechanism and the bolt member 11.

The mechanical gear assembly could take a number of different forms including one or more sliders and/or rotational elements which interact with each other to provide the required functionality.

In some embodiments, the mechanical gear assembly may also be configured to operate the or each latch member 3—i.e. to drive movement thereof between the extended and retracted positions. In some embodiments, however, separate mechanical gear assemblies are provided to operate the or each latch member 3 compared to the bolt member 11.

The assembly 1 may include a handle (not shown) which is configured to be manually moved between first and second positions to cause movement of the or each latch member 3 between their extended and retracted positions. The handle may be configured to be mounted to the housing 10 (e.g. to the main body 102) such that a shaft member of the handle extends through at least part of the housing 10. The housing 10 may, therefore, define a handle shaft receiving aperture 104 for this purpose. The handle shaft receiving aperture 104 may be further defined through at least part of the mechanical gear assembly for operation of the or each latch member 3 and/or the bolt member 11.

In some embodiments, the mechanical gear assembly which is configured to operate the or each latch member 3 includes a first gear member 121. The first gear member 121 may be mounted with respect to the housing 10 for rotation with respect thereto and may also, at least partially, define the handle shaft receiving aperture 104. The first gear member 121 may include an arm which carries a pin which is at least partially received within a linear slot 105 (which may be defined by the housing 10). The pin may be additionally at least partially received by an aperture defined by at least one of the or each latch members 3. The arrangement may be such that rotation of the first gear member 121 causes movement of the pin within the linear slot and drives movement of the or each latch member 3 between the extended and retracted positions. As will be understood, this allows the latch member 3 to be retracted to enabling the opening of the door or window, for example (along with the extension of the or each latch member 3 so that the door or window is held closed).

The mechanical gear assembly may include a second gear member 122 which is mounted with respect to the housing 10 for rotation with respect thereto. The second gear member 122 may include an arm which engages at least one of the or each latch members 3 such that movement of that or those latch members 3 between the extended and retracted positions causes rotational movement of the second gear member 122. The second gear member 122 may be associated with one or more resilient biasing members (such as springs) which are configured to provide the aforementioned resilient biasing o the or each latch member 3.

The mechanical gear assembly may, in some embodiments, include a third gear member 123 which is configured to engage the first or second gear member 121,122, such that rotation of that gear member 121,122 causes rotation of the third gear member 123 with respect to the housing 10. The third gear member 123 may, therefore, also be housed by the housing 10 (e.g. the main body 102). The third gear member 123 may be configured to engage the bolt member 11 so as to drive the bolt member 11 towards its retracted position. As such, the third gear member 123 may carry a protrusion which is configured to engage a corresponding recess 111 defined by the bolt member 11. The recess 111 and protrusion 1231 may be so shaped to permit the third gear member 123 to drive movement (through engagement of the protrusion and a wall of the recess) of the bolt member 11 towards the retracted position but not towards the extended position. In other words, the recess 111 may be at least partially defined by a first engaging surface (to engage the protrusion 1231) but there may be no corresponding engaging surface opposing the first engaging surface across the recess 111. In some embodiments, the third gear member 123 may be configured to rotate in an opposite direction to the first (or second) gear member 121,122 with which it engages.

This enables rotation of the handle in one direction to retract the or each latch member 3 and the bolt member 11, if the lock mechanism is in an unlocked state and to inhibit movement of the handle (with respect to the housing 10) when the lock mechanism is in a locked state (as the lock mechanism will be preventing movement of the bolt member 11 and so also the third gear member 123).

The engagement of one gear member 121-123 with another 121-123 may be provided by the meshing of teeth thereof, for example.

The bolt member 11 may define the aforementioned recess for receipt of the protrusion of the third gear member 123.

The bolt member 11 may define a guide slot 112 which is configured to receive at least part of a guide pin 106 mounted to the housing 10. The guide slot 112 and guide pin 106 may be configured to guide movement of the bolt member 11 between the extended and retracted positions. The guide slot 112 may, therefore, be a linear slot aligned along the bolt member axis. The guide slot 112 and pin 106 may further be configured to limit movement of the bolt member 11 along the bolt member axis.

The bolt member 11 may include a limit element 113 which is configured to limit (or assist in limiting) movement of the bolt member 11 beyond the extended position (i.e. further away from the retracted position). The limit element 113 may be configured to abut a part of the housing 10 when the bolt member 11 is in the extended position.

The bolt member 11 may include a lock mechanism engaging element 114 which is configured to engage at least part of the lock mechanism or an intermediate element when the lock mechanism is in its locked state—to inhibit or substantially prevent movement of the bolt member 11 to the retracted position. The lock mechanism engaging element 114 may be an extension from a main body of the bolt member 11.

The assembly 1 may further include the intermediate member which may be configured to provide mechanical coupling between the lock mechanism and the bolt member 11.

The bolt member 11 can, as will be understood, therefore, be driven into the extended position and held in that position by the lock mechanism. Retraction of the bolt member 11 may be driven by rotation of the handle and, in some embodiments, may be driven by the lock mechanism 10.

The assembly 1 may further include a switch 2. The switch 2 may be housed within the housing 10 (e.g. the main body 102). The switch 2 may be located adjacent the lock mechanism (i.e. adjacent the aperture 103).

In some embodiments, the switch 2 is positioned with respect to the bolt member 11 such that operation of the bolt member 11 between the extended and retracted positions actuates the switch 2 between on and off states.

The switch 2 may, therefore, include an actuator which is configured to engage a part of the bolt member 11 during movement of the bolt member 11—the engagement may be direct engagement. This part may be a protrusion which extends from the bolt member 11 and could be the limit element 113, for example, or some other element.

In some embodiments, the switch 2 includes a microswitch and the actuator may be an armature or switch element of the microswitch.

The switch 2 may be positioned for direct engagement with the bolt member 11. Direct engagement means that the actuator of the switch engages the bolt member 11 itself to cause actuation of the switch 2 (rather than via some complex mechanical coupling).

The switch 2 may be mounted within the housing 10 may one or more screws, bolts, or rivets, for example, or may be adhered to the housing 10.

The assembly 1 may include a power source 6 which is in electrical communication with the switch 2.

The power source 6 may be located remotely from the switch 2 and may be located outside of the main body 102 of the housing 10. The power source 6 may, however, be mounted to the faceplate member 101 and electrically coupled to the switch 2 by two or more electrical conductors (such as wires or tracks on a printed circuit board).

The power source 6 may include a battery which may be of the coin cell or button cell type.

The power source 6 may be provided in an auxiliary housing 107 of the housing 10. The auxiliary housing 107 may be remote from the main body 102 but may be mounted to the faceplate member 101. The main body 102 and the auxiliary housing 107 may extend away from the faceplate member 101 in generally the same direction. The auxiliary housing 107 may be configured to be received by at least part of the moveable panel 7 forming the door or window (e.g. by the frame thereof).

Figure 3A:
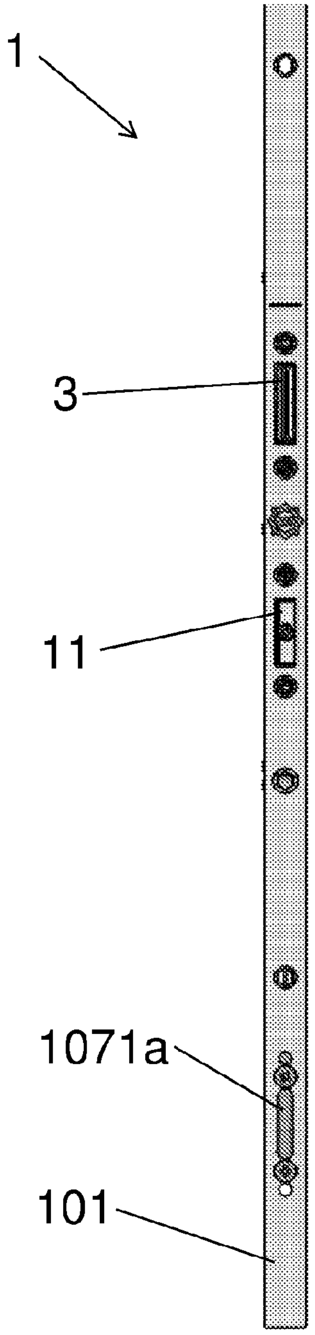
FIGS. 3*a* and 3*b* show side views of an assembly.
Figure 3B:
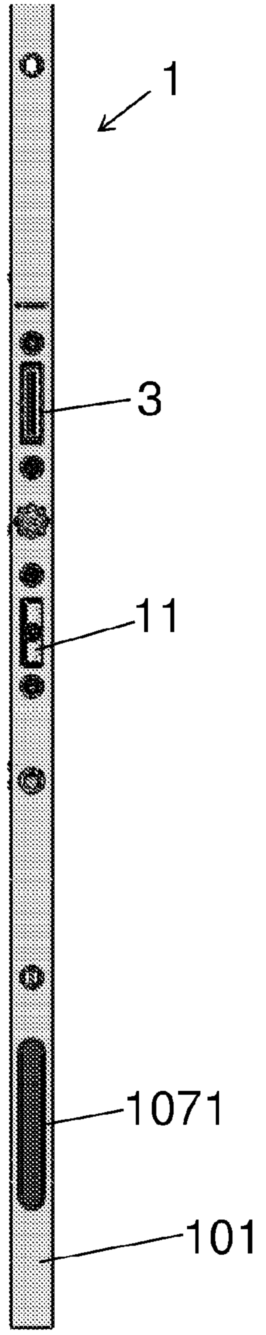

The auxiliary housing 107 may include a cover member 1071 which, when the auxiliary housing 107 is mounted to the faceplate member 101, is configured to cover an aperture 1071*a* defined by the faceplate member 101 and associated with the auxiliary housing 107. With the cover member 1071 removed (as shown by example in FIG. 3A), access may be obtained—in some embodiments—through the faceplate member 101 to at least part of the interior of the auxiliary housing 107. The cover member 1071 may be held in place by an interference fit and/or by one or more removable fixing members such as bolts or screws. FIG. 3B shows the cover 1071 in place.

The removal of the cover member 1071 may enable the power source 6 within the auxiliary housing 107 to be removed and replaced (e.g. to replace the battery).

In some embodiments, the cover member 1071 includes a power source carrier such that removal of the cover member 1071 also removes the power source 6 from the auxiliary housing 107. The power source carrier may be in the form of a battery cradle for example which is configured to receive the battery (in relevant embodiments).

The aperture 1071*a* defined by the faceplate member 101 and associated with the auxiliary housing 107 may, therefore, be sized and shaped to allow—in some embodiments—the passage of a battery therethrough (and in some embodiments, the battery and a battery cradle).

The cover member 1071 and/or the auxiliary housing 107 may have a width which does not extend beyond the edges of the faceplate member 101.

In some embodiments, the cover member 1071 may be partially removable—e.g. the cover member 1071 maybe hinged such that the cover member 1071 can be rotationally moved between open and closed positions. In some embodiments, the cover member 1071 may be partially removable such that at least part of a battery cradle of the cover member 1071 is retained within the auxiliary housing 107 when the cover member 1071 is in an open position (the battery, in relevant embodiments, being removable and replaceable from the cradle in this position).

The assembly 1 may include a transmitter 8. The transmitter 8 may be in electrical communication with one or both of the power source 6 and the switch 2. The power source 6 may provide electrical power to the transmitter 8 (which may be a wireless transmitter). In some embodiments, the transmitter 8 is a radio frequency communications transmitter, which may be configured to transmit one or more signals using a wireless communication protocol such as Wifi, Bluetooth, or the like.

The transmitter 8 may be located on the housing 10. In some embodiments, the transmitter 8 is located within the main body 102. In some embodiments, the transmitter 8 is located within the auxiliary housing 107. In some embodiments, the transmitter 8 may be provided in another sub-housing of the housing 10 which may be mounted to the faceplate member 101, for example.

In some embodiments, the auxiliary housing 107 (or other housing in which the transmitter 8 is located) may be made of a plastics material. This may provide range improvements compared to locating the same transmitter 8 in a metal housing (the main body 102 may be an example of such a metal housing).

The transmitter 8 is configured to transmit an indication as to whether the bolt member 11 is in the retracted or extended position to a remote device 9. As describe in more detail below, the remote device 9 may be a computing device such as a mobile phone (i.e. a cellular telephone), a mobile computing device (such as a laptop, a tablet, a desktop computer), or a hub device, for example.

The transmitter 8 may include, therefore, one or more storage elements which are configured to store the current position of the bolt member 11. The transmitter 8 may include one or more processing elements which are configured to interpret one or more signals received from the switch 2 to determine the current position of the bolt member 11.

In some embodiments, the assembly 1 includes a receiver 81, which may be provided with the transmitter 8 as a transceiver. The receiver 81 may be configured to receive one or more requests for an indication of the current position of the bolt member 11 and to process the or each request such that the transmitter 8 then transmits—in response—a signal indicating the current position of the bolt member 11.

In some embodiments, the assembly 1 includes a clock—which may be provided as part of the transmitter 8 for example. The clock may be configured to provide a signal indicative of the current time or the time since an event (such as the replacement of the power source 6). The transmitter 8 may be configured to output the signal indicative of the current time or time since an event with the signal indicative of the current state of the bolt member 11.

In some embodiments, the remote device 9 is configured to receive the signal indicative of the current position of the bolt member 11 and to store and/or forward that indication to another device.

For example, the remote device 9 may be a computing device which is configured to receive the indication. The computing device may be executing a program which receives and stores that indication. The program may cause the display, for example, of a visual indication of the current position of the bolt member 11. The program may be configured to store the current position of the bolt member 11 in a log, e.g. in association with a current time (which may be determined from the signal received from the transmitter 8 and/or by the remote device 9 itself).

The remote device 9 may be coupled to a network and may be configured to transmit the current position of the bolt member 11 to another device—such as a remote server. In this example, therefore, the remote device 9 may be a hub device (which may be communicatively coupled to one or more assemblies 1). The other device may then store the indication—in association with a time or otherwise—and may service requests made by others for the current position of the bolt member 11.

In some embodiments, the transmitter 8 is configured to transmit the current position of the bolt member 11 in response to a received request. In some embodiments, the transmitter 8 is configured to transmit the current position of the bolt member 11 periodically (e.g. at regular intervals). In some embodiments, the transmitter 8 is configured to transmit the current position of the bolt member 11 when the position of the bolt member 11 changes.

Such assemblies 1 may be provided in relation to a plurality of moveable panels 7 (e.g. in relation to a plurality of doors and/or windows). Therefore, the signal indicating the current position of the bolt member 11 may include a signal indicating the position of the bolt member 11 may include an identifier for the assembly 1 transmitting the signal—each assembly 1 having a unique or substantially unique identifier.

As will be understood, therefore, a user may interrogate a computing device to obtain an indication of the current position of the bolt member 11 of a particular assembly 1. This functionality may be provided via another device (such as a hub or server) and an application (i.e. a program) may execute on the computing device to obtain the position indication. The use may be able to check multiple different assemblies in this manner.

In some embodiments, the assembly 1 may include multiple switches 2. The assembly 1 may comprise multiple bolt members 11, such that multiple indications may be generated of the positions of those bolt members 11 (or a single indication may be provided to indicate if all of the bolt members 11 are in a particular position or not).

In some embodiments one or more bolt members 11 may take different forms to that described herein. In particular one or more bolt members 11 may be in the form of hooks rather than linearly moving bolt members 11.

Embodiments of the present invention include moveable panels 7 to which the assembly 1 has been fitted. Embodiments of the present invention include windows or doors to which the assembly 1 has been fitted.

Embodiments include the provision of the remote device 9.

As will be understood, some embodiments seek to provide a simple and robust mechanism to confirm the position of a bolt member 11. The engagement of the switch 2 with the bolt member 11 itself seeks to provide a reliable indication of the position of the bolt member 11 and inhibit unauthorised access to the switch 2 (to avoid a potential thief, for example, tampering with the switch 2. Furthermore, some embodiments may be retrofitted to existing doors and/or windows. In some instances, there is little or no visual indication of the presence of the assembly 1 when the door or window is closed. Therefore, a thief may not be aware of the presence of the assembly and the assembly 1 does not detract from the aesthetics of the moveable panel 7.

In some embodiments, the provision of the power source 6 remotely from the main housing 2 allows the power source 6 to be changed easily (e.g. without dismantling of the main housing 102 or removal of the faceplate member 101).

In some embodiments, the provision of the transmitter 8 (and/or receiver 81) outside of the main body 101 of the housing 10 (e.g. in the auxiliary housing 107) means that a lower power transmitter 8 can be used—which increases the time between power source 6 replacement—and/or a longer range is possible (which may be particularly significant in embodiments which use a hub as the remote device 9).

Collectively, the power source 6, the transmitter 8 (and/or receiver 81), and the switch 2 may comprise an indicator sub-system 100 of the assembly 1.

Figure 6:
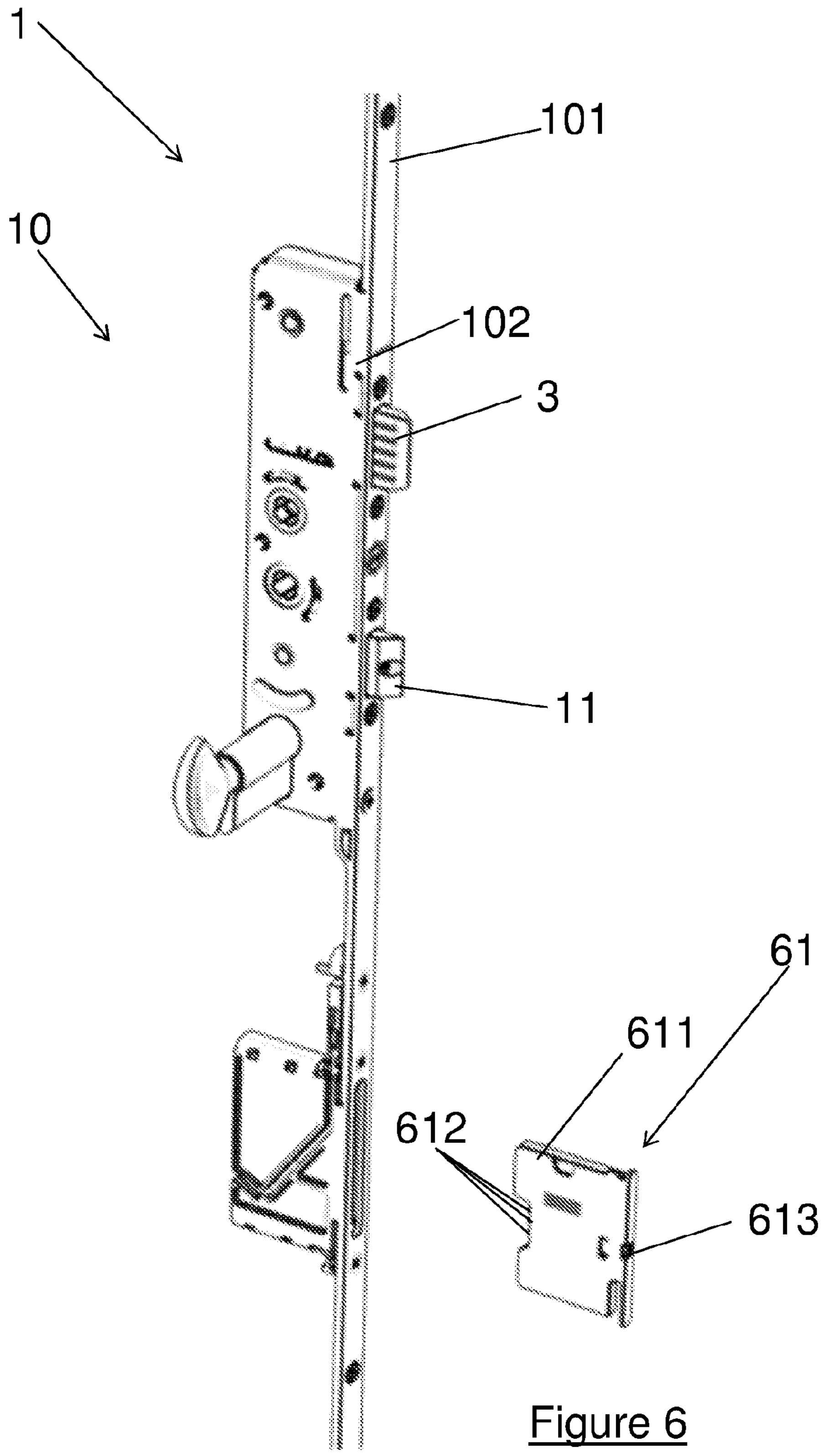
FIG. 6 show aspects of some embodiments.

With reference to FIG. 6 in particular (but also to the other figures), the power source 6, the transmitter 8 (and/or receiver 81), may be provided in the form of a cartridge. This cartridge may be removable from the auxiliary housing 107 and replaceable with the same or a different cartridge.

The cartridge may include a cartridge housing which is configured to contain substantially one or more of the power source 6, the transmitter 8, and receiver 81. The cartridge housing may be formed of a plastics material or another electrically insulating material.

In some embodiments, the cartridge housing is a sealed unit such that the contents of the cartridge housing cannot be accessed without damage to the cartridge housing.

In some embodiments, the cartridge housing may be openable to gain access to one or more of the contents thereof (without damage to the contents or cartridge housing). For example, in some embodiments, the power source 6 may be accessible through an aperture defined by the cartridge housing and/or may be accessible by opening the cartridge housing—in embodiments in which such opening is possible. This may, therefore, allow the power source 6 to be replaced.

In other embodiments, such as those in which the cartridge housing is a sealed unit, the power source 6 may be located within the cartridge housing and cannot be removed and replaced.

The cartridge may include one or more (e.g. two or three) external electrical contacts. The one or more external electrical contacts may protrude from a part of the cartridge housing. The or each electrical contact may be in electrical communication with one or more of the components within the cartridge housing—i.e. one or more of the power source 6, the transmitter 8 (and/or receiver 81).

The one or more external electrical contacts may—as described herein—be configured to be connected in electrical communication with the switch 2.

Accordingly, even in the case of a cartridge housing which is provided as a sealed unit, the one or more external electrical contacts may be accessible (on an outer surface of the cartridge housing) to allow connection to the switch 2.

In some embodiments, the or each external electrical contact is in the form of a pin or a ball or a pad contact. The or each external electrical contact may form an array of contacts.

The auxiliary housing 107 may, in some embodiments, include or be in the form of a pocket which is configured to receive substantially all or part of the cartridge (and, therefore, the cartridge housing). Accordingly, in some embodiments, the cartridge may be configured to be received by the auxiliary housing 107. An aperture of the pocket may be located at or adjacent the faceplate member 101 and may be generally adjacent the aperture 1071*a*. In some embodiments, the pocket is fitted to the aperture 1071*a*.

The pocket may be configured to receive the cartridge in such a manner that, with the cartridge so received, the moveable panel 7 may still be closed. In some embodiments, this may mean that an outer surface of the cartridge housing is substantially flush with an outer surface of the faceplate member 101 (although this may encompass protrusion from that outer surface of the faceplate member 101 to the extent that this does not hinder closing of the moveable panel 7 (e.g. 0.1-2 mm)).

The cartridge may be inserted into the pocket (i.e. into the auxiliary housing 107) through the aforementioned aperture. In some embodiments, the cartridge may be so inserted such that an outer surface or edge of the cartridge (i.e. the cartridge housing) is visible through that aperture. This outer edge or surface is an edge of surface (visible or not) which is adjacent the faceplate member 101. An opposing surface or edge of the cartridge (i.e. of the cartridge housing) may be referred to as an inner surface or edge, as it is remote from the faceplate member 101 when received by the pocket.

The pocket may have a remote end which is open or closed.

In some embodiments, the or each external electrical contact of the cartridge is configured to abut or otherwise engage one or more corresponding electrical contacts of the auxiliary housing 107 (e.g. of the pocket). These one or more electrical contacts may be referred to, therefore, as auxiliary housing electrical contacts. In some embodiments, the or each auxiliary housing electrical contact is provided within the pocket.

In some embodiments, the or each external electrical contact is provided on the inner surface or edge of the cartridge and, as such, the or each auxiliary housing electrical contact may be provided in a closed end surface of the pocket. In other embodiments, the arrangement of the electrical contacts may be different but the external electrical contacts may still be provided on a part of the cartridge which is received by the auxiliary housing 107.

The auxiliary housing electrical contacts may be in electrical communication with the switch 2, for example. Accordingly, abutment of the electrical contacts as described may allow electrical communication between one or more of the power source 6, the transmitter 8, and receiver 81, and the switch 2.

A retaining mechanism may be provided to retain, selectively, the cartridge so that it is received by the auxiliary housing 107 (and the electrical contacts abut as described, for example). The retaining mechanism could take a number of different forms, such as a rotatable engagement member mounted on the cartridge (i.e. the cartridge housing) or the auxiliary housing 107 and configured to engage—selectively—the other of the cartridge (i.e. the cartridge housing) or the auxiliary housing 107. In other embodiments, the retaining mechanism includes one or more resilient catch members or the like.

Accordingly, the cartridge may be selectively retained and released from the auxiliary housing 107 in some embodiments.

The cartridge (i.e. the cartridge housing) and the auxiliary housing 107 may be keyed such that the cartridge is only receivable by the auxiliary housing 107 in one orientation.

The cartridge may be blade like in form (i.e. relatively thin and flat).

The provision of a cartridge may seek to allow the simple removal and replacement of the cartridge (with the same or a different cartridge). This may allow for a simple and secure means by which to replace the power source 6. In addition, or alternatively, the entire cartridge may be replaced. An old cartridge may be removed and a new cartridge inserted. The new cartridge may include a new/different power source 6 or a different transmitter 8 and/or receiver 81. This may enable, for example, upgrades to be implemented to changes in the type of communication used by the transmitter 8 and/or receiver 81. In some embodiments (e.g. changing a Bluetooth transmitted to a WiFi transmitter or vice versa). Likewise, faulty components may be readily replaced (e.g. by replacement of the entire cartridge). In some embodiments, new functionality may be introduced by replacement of an existing cartridge by a new cartridge. Therefore, in some embodiments, a replacement/new cartridge may not have the same components as an old cartridge (or may have the same components but different software or firmware).

In some embodiments, the cartridges may be configured to expire after a predetermined period of time (or if some other predetermined parameter is reached) and require replacement. The expiry period/parameter may be set, for example, to ensure consistent operability and may be determined by the expected discharge rate of the power source 6. In some embodiments, expiry may be based on a number of actuations of the switch 2 as sensed by the transmitter 8, for example.

In some embodiments, the cartridge may store one or more updates (e.g. software or firmware updates) for the remote device 9 which may be communicated to the remote device 9 using the transmitter 8. Therefore, replacement of the cartridge may be used to update the remote device 9.

In some embodiments, the cartridge is only accessible (without damage) or is only easily accessible via the faceplate member 101 and, therefore, with the moveable panel 7 open. This provides security from tampering (whilst the moveable panel 7 is closed) whilst still allowing relatively easy access by a user (with the moveable panel 7 open).

As will be understood, therefore, in some embodiments the power source 6 and the transmitter 8 may be provided in the auxiliary housing 107 (e.g. in a cartridge received by the auxiliary housing 107). The content of the auxiliary housing 107 may be accessible through the faceplate member 101 (whether those contents are provided in a cartridge or otherwise).

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A lock indicator and a mechanical lock assembly, comprising:

a switch;

a power source;

a transmitter coupled to the power source; and a bolt member moveable between a retracted position and an extended position with respect to a housing of the assembly, wherein the switch is positioned with respect to the bolt member such that the switch is actuatable by the bolt member to determine the position of the bolt member, and the transmitter is configured to transmit a signal indicative of the position of the bolt member to a remote device, wherein the bolt member is located in a main body of the housing of the assembly and the power source is located in an auxiliary housing remote from the main body of the housing, wherein the housing includes a faceplate member and the power source is accessible through an aperture defined by the faceplate member, and wherein, when the bolt member is in the extended position, a portion of the bolt member extends beyond the confines of the main body of the housing through an aperture defined by the faceplate member, and wherein the main body and the auxiliary housing extend away from the faceplate member in generally the same direction.

2. An assembly according to claim 1, wherein the switch is configured to be actuated by direct engagement with the bolt member.

3. An assembly according to claim 1, wherein the transmitter is a wireless transmitter.

4. An assembly according to claim 1, wherein the auxiliary housing is made of a plastics material.

5. An assembly according to claim 1, wherein the transmitter is located within the auxiliary housing.

6. An assembly according to claim 5, wherein the transmitter and power source are provided in a cartridge configured to be received by the auxiliary housing.

7. An assembly according to claim 6, wherein the cartridge includes one or more external electrical contacts configured to about one or more auxiliary housing electrical contacts to provide electrical communication between the transmitter and the switch.

8. An assembly according to claim 6, wherein the cartridge is replaceable.

9. An assembly according to claim 1, wherein the bolt member is manually moveable.

10. An assembly according to claim 1, further including a lock mechanism which is configured to receive a key and to drive movement of the bolt member.

11. A door or window including:

a moveable panel; and a lock indicator and a mechanical lock assembly, comprising:

a switch;

a power source;

a transmitter coupled to the power source; and a bolt member moveable between a retracted position and an extended position with respect to a housing of the assembly, wherein the switch is positioned with respect to the bolt member such that the switch is actuatable by the bolt member to determine the position of the bolt member, and the transmitter is configured to transmit a signal indicative of the position of the bolt member to a remote device, wherein the bolt member is located in a main body of the housing of the assembly and the power source is located in an auxiliary housing remote from the main body of the housing, wherein the housing includes a faceplate member and the power source is accessible through an aperture defined by the faceplate member, and wherein, when the bolt member is in the extended position, a portion of the bolt member extends beyond the confines of the main body of the housing through an aperture defined by the faceplate member, and wherein the main body and the auxiliary housing extend away from the faceplate member in generally the same direction.

12. A system including an assembly according to claim 1, wherein the remote device configured to receive the signal indicative of the position of the bolt member.

13. A lock indicator and a mechanical lock assembly, comprising:

a switch coupleable to a transmitter;

a cartridge including the transmitter and a power source; and a bolt member moveable between a retracted position and an extended position with respect to a housing of the assembly, wherein the switch is positioned with respect to the bolt member such that the switch is actuatable by the bolt member to determine the position of the bolt member, and the transmitter is configured to transmit a signal indicative of the position of the bolt member to a remote device, wherein the bolt member is located in a main body of the housing and the cartridge is located in an auxiliary housing remote from the main body of the housing, wherein the housing includes a faceplate member and the cartridge is accessible through an aperture defined by the faceplate member, and wherein, when the bolt member is in the extended position, a portion of the bolt member extends beyond the confines of the main body of the housing through an aperture defined by the faceplate member, and wherein the main body and the auxiliary housing extend away from the faceplate member in generally the same direction.

* * * * *